(12) United States Patent
Larsen et al.

(10) Patent No.: US 7,757,710 B2
(45) Date of Patent: Jul. 20, 2010

(54) HIGH-PRESSURE REGULATOR

(75) Inventors: Todd W. Larsen, Milaca, MN (US); David L. Thomas, Saint Joseph, MN (US); Eric W. Neumann, Princeton, MN (US)

(73) Assignee: Tescom Corporation, Elk River, MN (US)

( * ) Notice: Subject to any disclaimer, the term of this patent is extended or adjusted under 35 U.S.C. 154(b) by 393 days.

(21) Appl. No.: 11/765,365

(22) Filed: Jun. 19, 2007

(65) Prior Publication Data

US 2008/0011361 A1  Jan. 17, 2008

Related U.S. Application Data

(60) Provisional application No. 60/805,105, filed on Jun. 19, 2006.

(51) Int. Cl.
*G05D 16/02* (2006.01)
*G05D 16/10* (2006.01)

(52) U.S. Cl. .................................. 137/505.25
(58) Field of Classification Search ............ 137/505.25, 137/505.28, 470, 468
See application file for complete search history.

(56) References Cited

U.S. PATENT DOCUMENTS

| | | |
|---|---|---|
| 208,961 A | 10/1878 | Crosby |
| 702,266 A | 6/1902 | Webb |
| 1,184,761 A | 5/1916 | Lytton |
| 2,002,450 A | 5/1935 | George |
| 2,047,101 A | 7/1936 | Grove |
| 2,493,111 A | 1/1950 | Courtot |
| 2,590,368 A | 3/1952 | Beck |
| 2,590,622 A | 3/1952 | Huber |
| 2,600,137 A | 6/1952 | Teague, Jr. |
| 2,851,564 A | 9/1958 | Zimmerman |
| 2,879,792 A | 3/1959 | Spence |
| 2,894,526 A | 7/1959 | Booth et al. |
| 2,963,040 A | 12/1960 | Zimmer |
| 3,093,155 A | 6/1963 | Dawes |
| 3,211,175 A | 10/1965 | Replogle |

(Continued)

FOREIGN PATENT DOCUMENTS

CH  544 901  11/1973

(Continued)

OTHER PUBLICATIONS

International Search Report for Application No. PCT/US08/65086, dated Oct. 17, 2008.

(Continued)

*Primary Examiner*—Stephen Hepperle
(74) *Attorney, Agent, or Firm*—Marshall, Gerstein & Borun LLP

(57) ABSTRACT

A high-pressure regulator includes body having a pressure inlet and a pressure outlet. A piston is disposed in the body and fluidly coupled to the pressure inlet and the pressure outlet. The piston is configured to operate in compression to contact a seat ring for the purpose of controlling the flow of fluid from the pressure inlet to the pressure outlet in response to a pressure applied to a surface of the piston via the pressure outlet. A piston seat circumferentially engages the piston to provide an improved seal at low temperatures.

18 Claims, 2 Drawing Sheets

U.S. PATENT DOCUMENTS

| | | | |
|---|---|---|---|
| 3,357,443 A | | 12/1967 | Brumm |
| 3,495,619 A | | 2/1970 | Ilzumi |
| 3,559,677 A | * | 2/1971 | Barosko ................ 137/470 |
| 3,583,431 A | | 6/1971 | Diel |
| 3,586,037 A | | 6/1971 | Zimmer |
| 3,664,369 A | | 5/1972 | Johnson |
| 3,698,425 A | * | 10/1972 | Fisher ................ 137/505.25 |
| 3,754,730 A | | 8/1973 | Nilles et al. |
| 4,020,863 A | * | 5/1977 | Fabish ................ 137/505.25 |
| 4,181,139 A | * | 1/1980 | Martini ................ 137/505.25 |
| 4,279,271 A | | 7/1981 | Neff |
| 4,305,423 A | | 12/1981 | Adler |
| 4,314,582 A | | 2/1982 | Drori et al. |
| 4,476,888 A | | 10/1984 | Lachmann et al. |
| 4,667,695 A | | 5/1987 | Gold et al. |
| 4,860,788 A | | 8/1989 | Asaoka et al. |
| 4,966,183 A | | 10/1990 | Williamson, Jr. |
| 4,967,783 A | | 11/1990 | Loos |
| 5,002,087 A | | 3/1991 | Feild |
| 5,230,359 A | * | 7/1993 | Ollivier ................ 137/505.39 |
| 5,251,655 A | | 10/1993 | Low |
| 5,309,934 A | | 5/1994 | Jaeger |
| 5,397,797 A | | 3/1995 | Ueno et al. |
| 5,452,741 A | | 9/1995 | Tomita et al. |
| 5,501,247 A | | 3/1996 | Miller |
| 5,826,613 A | | 10/1998 | Schalk et al. |
| 5,913,328 A | | 6/1999 | Taube et al. |
| 6,047,727 A | * | 4/2000 | Hatori et al. ............ 137/505.28 |
| 6,056,006 A | * | 5/2000 | Hagerty ................ 137/505.25 |
| 6,058,962 A | | 5/2000 | Hayashi et al. |
| 6,170,519 B1 | | 1/2001 | Carroll et al. |
| 6,321,779 B1 | * | 11/2001 | Miller et al. ............ 137/505.25 |
| 6,412,750 B1 | | 7/2002 | Jun et al. |
| 7,293,574 B2 | * | 11/2007 | Schwartz et al. ....... 137/505.25 |
| 2003/0116740 A1 | * | 6/2003 | Schroeder et al. ........ 251/149.6 |
| 2004/0007269 A1 | | 1/2004 | Larsen |
| 2004/0216781 A1 | | 11/2004 | Larsen |
| 2006/0113835 A1 | | 6/2006 | Krueger et al. |
| 2006/0225795 A1 | | 10/2006 | Baker |
| 2006/0231142 A1 | | 10/2006 | Schwartz |

FOREIGN PATENT DOCUMENTS

| | | |
|---|---|---|
| DE | 20 2004 001 877 | 4/2004 |
| DE | 10 2004 056 661 | 6/2006 |
| FR | 2 253 413 | 6/1975 |
| FR | 2 879 721 | 6/2006 |
| WO | WO-00/70419 | 11/2000 |
| WO | WO-2005/124493 | 12/2005 |

OTHER PUBLICATIONS

International Preliminary Report on Patentability for Application No. PCT/US2007/071598, dated Apr. 7, 2009.

* cited by examiner

HIGH-PRESSURE REGULATOR

FIELD OF THE DISCLOSURE

This invention relates generally to a pressure regulator for high-pressure applications and, more particularly, to a high-pressure regulator for a tank dispensing compressed hydrogen.

BACKGROUND

Hydrogen has been demonstrated to be a very appealing alternative fuel supply for many applications, including automobiles, because the only by-products of hydrogen consumption are heat and water. Current hydrogen fuel supplies rely upon hydrogen fuel cells to generate electricity from stored hydrogen, which may be used to operate an electric motor to power an automobile. In automotive fuel cell applications, hydrogen is typically stored in a gaseous state in a tank at relatively high pressures approaching 700 bar or 10,000 psi. The high-pressure storage provides a large supply of hydrogen in a reduced storage volume. The fuel cell generally draws hydrogen from the tank through a system of tubes or pipes as needed to maintain energy conversion, but it must be operated at significantly lower pressures (e.g., 200 psi) than the stored hydrogen for reduced system expense and safety. Typically, at least one pressure regulator is provided between the tank and the fuel cell to reduce the pressure of the compressed hydrogen from the tank to a pressure suitable for the fuel cell system.

It is well understood that as the hydrogen is removed from the tank through the pressure regulator, a rapid decrease in pressure of the hydrogen causes a corresponding decrease in the temperature of the hydrogen within the pressure regulator that can approach −50 Celsius. Additionally, in certain environments, the operating temperatures can also reach temperatures of +85 Celsius. Such extreme temperature ranges make sealing the regulator very difficult. For example, at extremely low temperatures, metal-to-metal seals and resilient seals contract causing leaks in the regulator, which may degrade pressure control performance. Conventional design techniques to counteract seal contraction problems involve providing seal-to-sealing surface tolerances and materials of construction that preferably seal at low temperatures. These same design techniques have been known to create "seizing" of regulator components at high operating temperatures as the seals expand and bind to prevent operation of the regulator. Additionally, problems can result from periodic or cyclic dispensing of the hydrogen from the tank.

Depending on the demand for hydrogen from the tank, the pressure regulator can be subjected to repetitive thermal or cooling cycles as the hydrogen is dispensed from the tank. These repetitive cycles can create undesirable operational and maintenance issues with the pressure regulator. For example, many conventional pressure regulators use multi-component interior valve assemblies that rely upon high-pressure seals within the valve assembly. The thermal cycles induce expansion/contraction cycles of the high-pressure seal components that can result in increased seal wear that may produce high-pressure leaks or even catastrophic failure of the regulator and/or the fuel cell system. Therefore, it would be beneficial to provide a pressure regulator that is significantly less susceptible to leaks and operational failures in high-pressure gas dispensing applications.

SUMMARY

Figure 1:
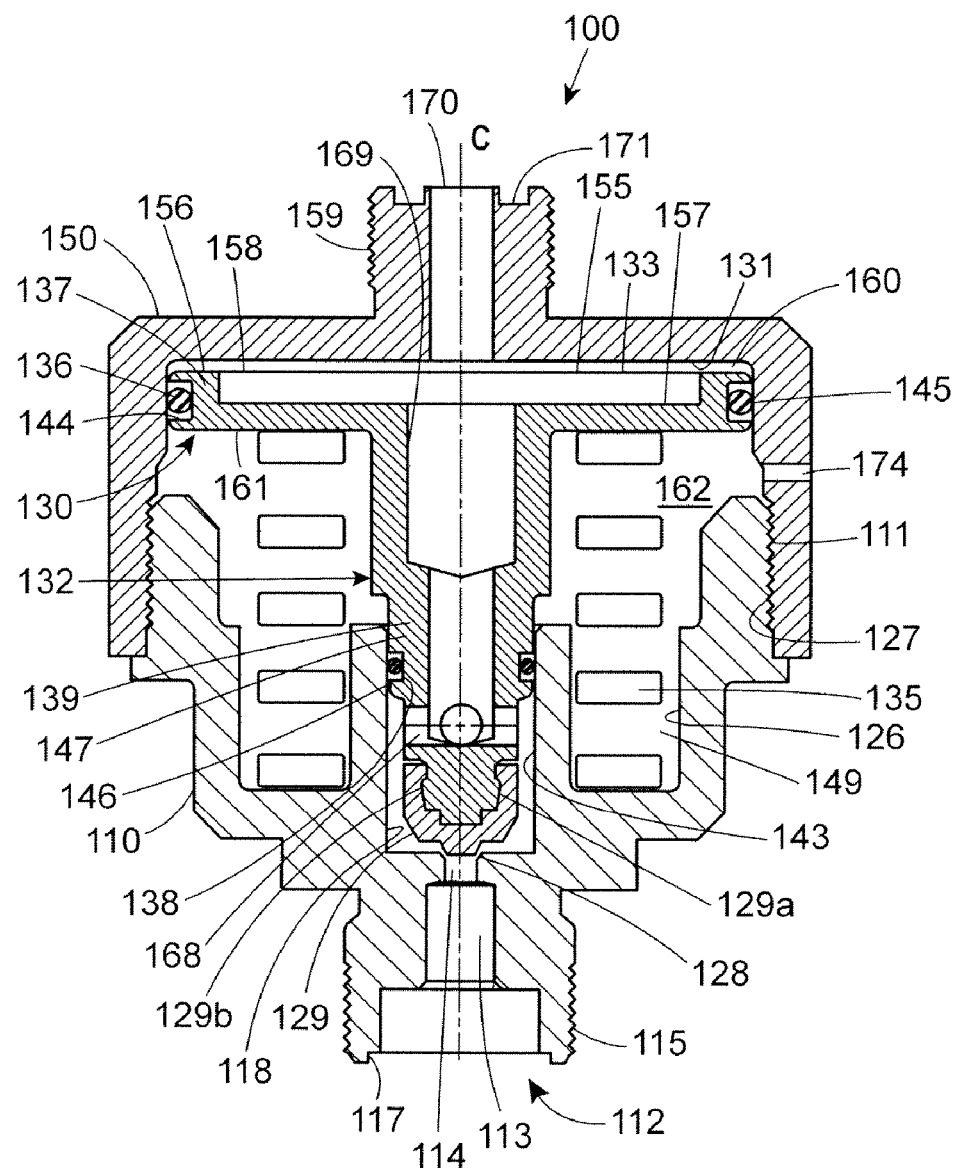
FIG. 1 is a cross-sectional view of an example high-pressure regulator having a predetermined regulated pressure.

In one disclosed example, a high-pressure regulator includes a body which is preferably of a substantially cylindrical shape, and includes an inner bore preferably concentric with an outer bore such that the inner bore defines a pressure inlet and includes a seat ring located within the inner bore. A bonnet forms a pressure chamber with a throughbore defining a pressure outlet preferably concentrically aligned with the inner bore. A piston assembly internally disposed between the body and the bonnet selectively engages the seat ring of the inner bore for controlling a fluid flowing from the pressure inlet to the pressure outlet. The piston assembly includes a piston, a piston seat and a loading element, wherein the piston seat is externally press-fit on the piston to circumferentially engage a piston base, which results in improved piston seat retention at extremely low temperature. The piston includes a first effective sensing area for a first operational mode and a second effective sensing area for a second operational mode.

In another disclosed example, a high-pressure regulator includes a body having a substantially cylindrical shape including an inner bore substantially concentric to an outer bore such that the inner bore defines a pressure inlet and includes a seat ring located within the inner bore. A substantially cylindrical bonnet forms a pressure chamber with a throughbore defining a pressure outlet substantially concentrically aligned with the inner bore. A piston assembly internally disposed between the body and the bonnet selectively engages the seat ring in the inner bore for controlling a fluid flowing from the pressure inlet to the pressure outlet. The piston assembly comprises a piston having a first sealing member and a second sealing member, a piston seat and a loading element operatively coupled to the piston to provide a loading element force. The arrangement of the first sealing member and the second sealing member provide a seal of the piston assembly at the bonnet and the body such that the first and second sealing members are not exposed to a relatively high inlet pressure thereby substantially reducing inlet pressure leaks within the body.

DETAILED DESCRIPTION

In general, the example high-pressure regulator described herein provides a single regulator body that contains an interior piston assembly to control fluid flow through the regulator. The outlet pressure of the example high-pressure regulator may remain substantially unaffected by variations in inlet pressure by relying upon direct outlet pressure feedback to control the fluid pressure. A preferred example high-pressure regulator, described in more detail below, operates using a compressive force balance across the piston assembly to maintain the regulator outlet pressure at a predetermined pressure or set point. Preferably, a single or unitary piston within the piston assembly may reduce the number of required components, thereby enabling a more compact design with improved reliability and performance while lowering manufacturing and assembly costs.

One skilled in the art will appreciate that the example pressure regulator is configured with seals only on the outlet or low pressure side of the regulator to substantially eliminate inlet pressure hydrogen leaks within the regulator. One skilled in the art will further appreciate that a piston seat is coupled to the piston without supplemental retaining devices to provide improved low temperature performance. The example regulator also advantageously provides an outlet pressure-assisted shutoff if a fluid leak occurs across the piston seat when the piston assembly is closed.

Referring now to FIG. 1, a cross-sectional view of an example non-adjustable, high-pressure regulator 100 for a high-pressure gas dispensing system for a hydrogen fuel cell is shown. The example high-pressure regulator 100 has a relatively small overall size (e.g., approximately D2.40"× H3.00") and has a substantially reduced total number of parts. Accordingly, the disclosed example offers a more reliable and less expensive, in-line, high-pressure regulator. In general, the example high-pressure regulator 100 is comprised of an interior piston assembly or module 130 disposed within a substantially single or unitary body 110. A bonnet 150 threadably attached to the body 110 forms an outlet pressure chamber 160 for pressure control. For the following description, the example high-pressure regulator 100 is shown in an open position, such as when the regulator is transitioning between a fully opened and a fully closed position.

As described above and shown in FIG. 1, the preferred embodiment of the example high-pressure regulator 100 includes the body 110 having a single pressure inlet 112 formed from a hollow cylinder extending from the body 110 and including multiple concentric passageways of varying diameter positioned along a longitudinal axis C. External threads 115 on the pressure inlet 112 are provided, as shown, to connect the regulator 100 to a compressed gas source, such as a high-pressure hydrogen tank (not shown). Other suitable coupling mechanisms for such high-pressure applications known by those skilled in that art may also be used. Preferably, a recess 117 is formed into the pressure inlet 112 to incorporate a high-pressure seal, such as a flat sheet gasket (not shown), to seal the regulator 100 to the tank. At the other end of the pressure inlet 112, a passageway 113 is formed in the body 110 to fluidly connect the piston assembly 130 to the pressure inlet 112 through an inlet pressure chamber 114, which will be discussed in greater detail below.

The body 110 further includes an inner cylindrical cavity 149, bounded by an interior wall 126 of the body 110. The cylindrical cavity 149 preferably is substantially aligned with the longitudinal axis C of the pressure inlet 112. This cylindrical cavity 149 is provided to retain a loading element 135, which is preferably a spring or other suitable loading element or biasing device. The loading element 135 biases the piston assembly 130 in a generally upward direction when viewing the Figures, as will be discussed in greater detail below. The body 110 may also include exterior threads 111 on an upper portion of the exterior wall 127 to threadably engage the bonnet 150 of the example high-pressure regulator 100 to form a pressure retaining assembly necessary to control the fluid flow. One skilled in the art can appreciate that the example high-pressure regulator could incorporate interior threads on the exterior wall and exterior threads on the bonnet 150 or other known attachment means to threadably couple the body 110 to the bonnet 150.

A pressure outlet 170 is formed on the bonnet 150 along the longitudinal axis C and is preferably substantially aligned to the pressure inlet 112. As shown, external threads 159 or the like are provided on the bonnet 150 to provide for a threaded connection to a fuel cell system. An annular groove 171 may also be provided to accommodate a seal, such as an o-ring seal (not shown) on the bonnet 150. The pressure outlet 170 is in direct fluid communication with the outlet pressure chamber 160 to provide outlet pressure feedback control.

Outlet pressure control is achieved by the regulator 100 outlet pressure interacting on a piston sensing area 158. The sensing area 158 is defined by an outlet pressure side 155 of the piston assembly 130, as described in detail below. The bonnet 150 and piston assembly 130 also define a separate ambient pressure chamber 162 to house the piston assembly 130. It should also be appreciated that the bonnet 150 includes a vent 174 within the ambient pressure chamber 162 to permit pressure equalization within the chamber to eliminate any "air spring" effect that may adversely affect the force balance necessary to operate the piston assembly 130.

The piston assembly 130 of the example high-pressure regulator 100 operates between the pressure inlet 112 and the pressure outlet 170 in a normally-open position (i.e., at pressures below a predetermined pressure or set point, fluid flows generally unobstructed from the inlet to the outlet) to regulate the fluid pressure, and therefore, the fluid flow. According to the disclosed example, the piston assembly 130 includes a single piston 132, the spring 135, a piston seat 129 and two annular seals 136 and 138.

As shown, the piston 132 is formed from a generally cylindrical base 139 substantially concentrically aligned with a piston head 137. The piston head 132 is preferably circular or substantially circular, although it is possible other shapes may prove sufficient. As shown in the Figures, the piston 132 has a generally T-shaped cross section. The piston 132 further incorporates a first annular channel 144 formed about the piston head 137 and a second annular channel 146 formed about a central portion 147 adjacent or above the piston base 139 to accommodate the two annular seals 136 (in the channel 144) and 138 (in the channel 146). The seals 136 and 138 may be o-rings. The seal 136 provides a seal between the ambient pressure chamber and the outlet pressure chamber 160, while the seal 138 provides a seal between the between ambient pressure chamber 162 and the inlet pressure chamber 114. The seals 136 and 138 may be manufactured from a polymer with suitable low-temperature performance and abrasion resistance such as ethylene propylene rubber (EPDM) available from the E. I. du Pont de Nemours, Wilmington, Del. Other materials may prove suitable.

From FIG. 1, it should be understood that the seals 136 and 138 isolate the ambient pressure chamber 162 from the outlet pressure chamber 160 to direct the fluid towards the pressure outlet 170 and prevent fluid from escaping through the vent 174 in the bonnet 150. The seals 136 and 138 and piston seat 129 are arranged to substantially reduce the risk of high-pressure leaks within the regulator by isolating certain regions of the regulator from fluid flow, as explained in greater detail below. Additionally, a lower surface 161 of the piston 132 may also be preferably configured to receive the loading element 135 (which may be a spring) to provide a predetermined force to counteract and/or balance an outlet pressure force exerted upon the sensing area 158 of the piston 132. The piston seat 129 includes an internal channel 129a sized to engage an annular ring 129b on the piston base.

To direct hydrogen from the pressure inlet 112 to the pressure outlet 170 for pressure control, the piston 132 includes at least one cross-bore 168 within the piston base 139 that interconnects the hydrogen from the tank through an axial bore 169 within the piston 132 to the outlet 170. To selectively control fluid flow from the high-pressure inlet 112, the piston seat 129 and a seat ring 128 within the body 110 form a variable restriction at the inlet pressure chamber 114 to control fluid pressure within the regulator 100. Specifically, to seal or close the valve during pressure control, the piston seat 129 is shaped to sealingly engage a chamfered edge of the seat ring 128 within the regulator body 110. It should be appreciated by one of ordinary skill in the art that the restriction presented by the valve creates a pressure reduction within the regulator. That is, the regulated outlet pressure of the example high-pressure regulator is controlled by a force balance acting on the piston 132. As would be known using known engineering principles, the piston 132 experiences an upward force due to the fluid pressure from the inlet 112 acting on the piston seat area and by the upward force of the loading element 135. The piston 132 experiences a downward force due to fluid pressure from the outlet acting on the sensing area of the piston 132. The sensing area may be the first effective sensing area formed by an outlet recess 157 (such as when the piston 132 is in its uppermost position), or may be the second effective sensing area formed by the full diameter of the piston 132 (such as when the piston 132 is moved downwardly slightly).

The sensing area 158 of the piston 132 is defined by an upper surface 133 of the piston 132. Initially at startup, when the output pressure is substantially below the desired set point, the outlet recess 157 on the piston 132 receives a control pressure via the axial bore 169 that yields a first outlet force proportional to a first effective sensing area related to the outlet recess 157 to counteract the force created by the inlet pressure and the spring 135. In the disclosed example, the outlet recess 157 in the piston ensures that the initial outlet pressure force, in a high-pressure application such as the present example application, is sufficient to initiate pressure control in opposition to the high inlet pressure forces, by providing additional area (i.e. greater than an outlet area) when the valve is initially fully opened. Once the piston 132 moves away from the bonnet 150, the entire upper surface 133 of the piston 132 is exposed to form a second effective sensing area approximately equal to the area of the outlet recess 157 and an annular area 156 yielding a proportional increase in outlet pressure feedback during pressure control. In accordance with the disclosed example, the area of the recess 157 is less than the area of the full piston. More specifically, the diameter of the recess 157 is about 1.694 inches, while the diameter of the full piston is about 1.976 inches.

The increased effective sensing area provides enhanced pressure control by providing greater feedback force resulting from the increased second effective sensing area. One of ordinary skill in the art should further appreciate that the example piston 132, as shown, has minimal inlet surface areas at the piston base 139 such that the outlet pressure feedback substantially offsets inlet forces on the piston 132 generated by the extremely high inlet pressures. This configuration allows the forces exerted upon the sensing area 158 to dominate outlet pressure control.

As shown in FIG. 1, the piston assembly 130, and more particularly, the sealing arrangement on the piston assembly 130, defines multiple pressure zones or regions within the regulator. The pressure regions are formed across the seals 136 and 138 as the piston 132 slidably engages a bonnet sealing surface 145 and a sealing surface 143 of an inner bore 118 of the body 110. For example, a first or high-pressure region exists between the pressure inlet 112, the seat ring 128 and the piston seat 129. A second or relatively lower pressure or controlled outlet pressure region exists between the axial bore 169 and the pressure outlet 170 in the outlet pressure chamber 160 between the inlet annular seal 138 and the outlet annular seal 136 and a third or ambient pressure region exists within the ambient pressure chamber 162. It should be appreciated by one of ordinary skill in the art that the formation of the pressure regions within the regulator substantially reduces the need for high pressure seals, which are generally susceptible to leaks at extremely low temperature operation at high pressure (i.e., the o-ring seals only need seal against the relatively lower outlet pressure).

Prior to pressure control, the spring 135 biases the piston 132 away from the seat ring 128 and into intimate contact with an inner surface 131 of the bonnet 150 to permit substantially unrestricted fluid flow from the pressure inlet 112 to the pressure outlet 170. The fluid flows from the pressure inlet 112 through the cross-bore passageways 168 and momentarily pressurizes the outlet pressure chamber 160 to a pressure above the predetermined outlet pressure. As the outlet pressure increases in the outlet pressure chamber 160, a increasing force is exerted upon the first effective sensing area 157 of the piston 132 in a predetermined manner such that the force, related to the annular area of the outlet recess 157, counteracts the loading force of the loading element 135 to move the piston 132, in compression, against the loading element 135 and towards the seat ring 128 exposing the second effective sensing area of the annular ring 156 to the outlet feedback pressure.

Thus, when the regulator 100 is near pressure control, the piston 132 has moved away from the inner surface 131 and the outlet pressure acts upon the entire sensing area 158 of the piston 132 to overcome the loading force of the loading element 135. When the outlet pressure is substantially equal to the desired operating pressure or set point, as determined by the force balance, the piston seat 129 fully engages the seat ring 128 to substantially inhibit fluid flow through the regulator. It should be further appreciated by one of ordinary skill in the art that during operation the piston 132 is continuously cycled towards and away from the piston seat 128 to maintain pressure control in response to variations in outlet pressures.

In the present embodiment, the surface area of the piston 132 is preferably sixteen times (16×) greater that the surface area of the seat ring 128 to counteract the inlet fluid pressure force. One skilled in the art should appreciate that other ratios may be possible without departing from the spirit and scope of the example high-pressure regulator, but generally the relatively large piston outlet surface areas ensure higher regulator gains, which results in lower regulator "droop" and stable control over a wide range of temperatures and pressures.

As previously described, the regulation or decrease in pressure of the high-pressure gas from the tank results in extremely low temperatures within the high-pressure regulator 100. Specifically, the rapid expansion of the gas at the seat ring 128 reduces internal temperatures to nearly −50 Celsius. These extremely low temperatures create local contraction of the regulator components including the seat ring 128, the piston base 139 and the regulator body 110, which can generally cause the regulator to leak and degrade control performance. The present example high-pressure regulator 100 uses the externally press-fit piston seat 129 to lessen the effects of thermal contraction on regulator performance. That is, under low temperature operation, the piston seat 129 contracts about the piston base 139 to affect a better connection therebetween. In the preferred embodiment, the piston seat 129 is manufactured from a temperature-stable polyimide, such as Vespel® from the E. I. du Pont de Nemours, Wilmington, Del. it should be appreciated by one of ordinary skill in the art that the coefficient of thermal expansion for Vespel can be greater than or equal to the coefficient of thermal expansion for the piston base 139, which is preferably manufactured from 316 L stainless steel. Accordingly, due to the different thermal expansion characteristics, at a pressure inlet fluid temperature below or substantially below an ambient fluid temperature, the piston seat firmly contracts about the piston base.

As such, during operation, the piston seat 129 contracts at a greater rate than the piston base 139 forming a tighter connection under high-pressure. Additionally, fluid pressure is exerted upon the piston seat 129 in a direction that drives the piston seat 129 onto the piston base 139, thus securing a more rigid connection. One of ordinary skill in the art should also appreciate that if there is a leak between the piston seat 129 and the seat ring 128, the outlet pressure may rise above the set point. In such a condition, the additional fluid flow creates an increase in the pressure of the outlet side of the piston assembly 130 and an additional closure force is generated against the sensing area 158. The additional force generated by the leak increases in proportion to the pressure differential across the seat ring 128 to "positively shut-off" the piston assembly 130 to quickly return the outlet pressure to the set point. Lastly, the annular seals 136 and 138 serve to isolate the loading element 135 for the fluid flow. It should be appreciated that in hydrogen applications, hydrogen may cause hydrogen embrittlement of metals that can substantially reduce operational life. The example high-pressure regulator improves operational life of the loading element 135 by substantially eliminating hydrogen exposure. Additionally, the loading element 135 may be manufactured from a high-strength, temperature-resistant, and/or corrosion-resistant alloy, such as Elgiloy® Cobalt Alloy from Elgiloy Specialty Metals of Elgin, Ill., which is known to be substantially less susceptible to the previously mentioned embrittlement effects.

Figure 2:
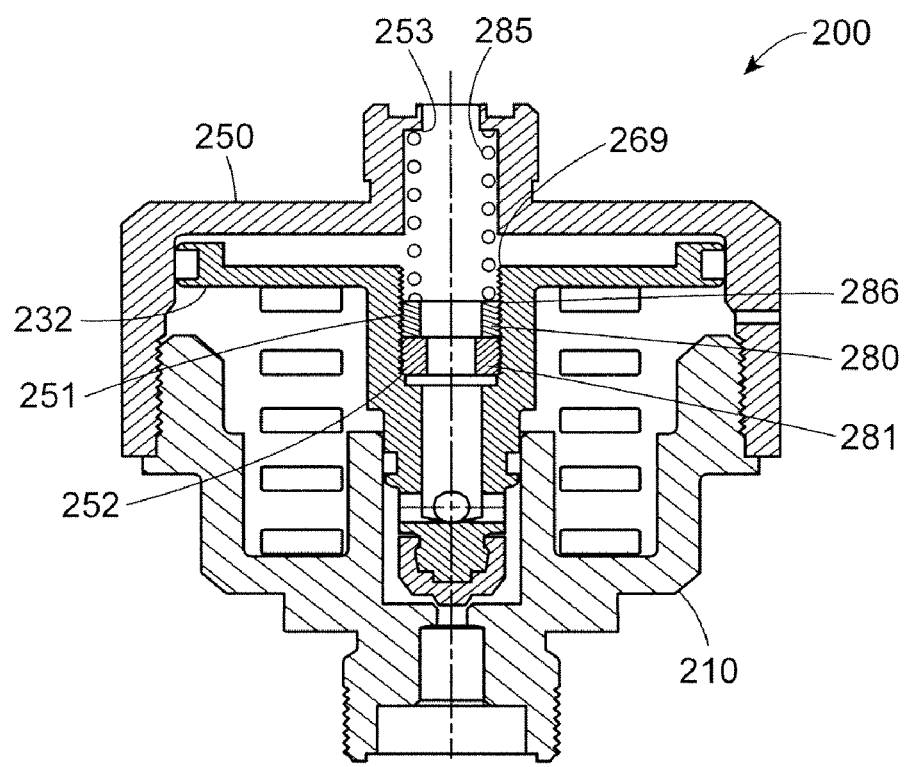
FIG. 2 is a cross-sectional view of an example high-pressure regulator having an adjustable regulated pressure.

FIG. 2 illustrates an alternate embodiment, which includes an adjustable high-pressure regulator 200. As previously described, the example regulator operates using a force balance across the piston assembly to control fluid flow. In the present alternate embodiment, the outlet pressure can be adjusted by modifying the preload on an adjusting spring 285 retained within the bonnet 250. The piston 232 for this embodiment includes at least one lock nut, and preferably two lock nuts 280 and 281 forming a lock nut assembly 286, incorporated with an axial bore 269 of the piston 232 to control the preload on the adjusting spring 285. Additionally, the bonnet 250 contains a shoulder 253 configured to retain the adjusting spring 285 when the piston 232 is initially installed within the body 210. It should be understood that the preload of the adjusting spring 285 is proportional to its compression, which is controlled by the position of the lock nuts 280 and 281 in the axial bore 269. That is, by increasing or decreasing the preload of the adjusting spring 285 by rotating or counter-rotating within internal/external mating threads 251 and 252, the bias force of the adjusting spring 285 can be controlled. Since the adjusting spring 285 supplies supplemental force to the outlet pressure force that is in opposition to or offsets the inlet pressure force and loading element forces previously described, it should be appreciated that by adjusting the position of the internal locking nuts 280 and 281, the supplemental force can be controlled, and therefore the outlet pressure can be adjusted.

Although certain apparatus, methods, and articles of manufacture have been described herein, the scope of coverage of this patent is not limited thereto. To the contrary, this patent covers all embodiments fairly failing within the scope of the appended claims either literally or under the doctrine of equivalents.

What is claimed is:

1. A pressure regulator comprising:
   a body having a pressure inlet;
   a bonnet having a pressure outlet and being operatively coupled to the body; and
   a piston assembly internally disposed between the body and the bonnet for selectively engaging a seat ring within the body for controlling a fluid flowing from the pressure inlet to the pressure outlet, wherein the piston assembly comprises:
      a piston having a piston head and a piston base including a bore therethrough to couple the pressure inlet to the pressure outlet, the piston having a first effective sensing area for a first operational mode and a second effective sensing area for a second operational mode;
      a loading element operatively coupled to the piston to provide a loading force on the piston to predetermine an outlet pressure;
      an adjustment means, disposed in the piston bore, for adjusting the outlet pressure; and
      a piston seat to engage the seat ring for fluid control, wherein the piston seat circumferentially engages the piston base.

2. The pressure regulator of claim 1, wherein the first effective sensing area is less than the second effective sensing area.

3. The pressure regulator of claim 1, wherein the piston seat is externally coupled to the piston base such that an inlet pressure provides a supplemental force to retain the piston seat to the piston base.

4. The pressure regulator of claim 1, wherein a coefficient of thermal expansion of the piston seat is greater than a coefficient of thermal expansion of the piston base.

5. The pressure regulator of claim 4, wherein the piston seat comprises a temperature-stable polyimide polymer.

6. The pressure regulator of claim 1, wherein the loading element comprises a Cobalt-Chromium-Nickel alloy.

7. The pressure regulator of claim 1, wherein the body includes an inner bore having a sealing surface, and wherein the piston includes a first seal coupled to the piston head and a second seal coupled to the piston base and sealing against the inner bore, whereby the piston seat and the first and second seals cooperate to minimize or reduce inlet fluid pressure from impinging on the seals.

8. A pressure regulator comprising:
   a body having a pressure inlet interconnected to an inlet pressure chamber formed between the pressure inlet and a seat ring disposed thereon;
   a bonnet having a pressure outlet interconnected to an outlet pressure chamber formed within the bonnet and being operatively coupled to the body; and
   a piston assembly internally disposed between the body and the bonnet to selectively engage the seat ring within the body for controlling a fluid having a relatively high inlet pressure at the inlet pressure chamber flowing to a relatively low outlet pressure at the outlet pressure chamber, wherein the piston assembly comprises:
      a piston having a piston head and a piston base including a bore therethrough to fluidly couple the inlet pressure chamber to the outlet pressure chamber, the piston head having a first sealing member to seal the piston assembly at the bonnet, the piston base having a second sealing member to seal the piston assembly at the body such that the first and second sealing members are not exposed to the inlet pressure of the inlet pressure chamber;
      a first loading element operatively coupled to the piston to provide a loading force on the piston to predetermine an outlet pressure;
      a second loading element, disposed in the piston bore and operatively coupled to the piston to provide an adjustable counter-loading force on the piston, which counter-loading force alters the outlet pressure formed in the second pressure chamber; and a piston seat to engage the seat ring for fluid control, wherein the piston seat circumferentially engages the piston base.

9. The pressure regulator of claim 8, wherein the piston includes a first effective sensing area for a first operational mode and a second effective sensing area for a second operational mode.

10. The pressure regulator of claim 8, wherein the coefficient of thermal expansion of the piston seat is greater than the coefficient of thermal expansion of the piston base such that at a pressure inlet fluid temperature substantially below an ambient fluid temperature, the piston seat firmly contracts about the piston base.

11. The pressure regulator of claim 8, wherein the outlet pressure formed in the outlet pressure chamber is proportional to a force generated by the outlet pressure acting upon the piston head, the inlet pressure acting upon the piston seat and the loading force generated by the first loading element.

12. The pressure regulator of claim 8, wherein the second loading element includes an adjustable spring assembly to counteract the loading force generated by the first loading element.

13. A pressure regulator comprising:

a body having an inner bore and an outer bore such that the inner bore forms a pressure inlet terminating at a seat ring and the outer bore defines a first pressure chamber of the pressure regulator;

a bonnet operatively coupled to the body to define a second pressure chamber of the pressure regulator, the bonnet having a throughbore to form a pressure outlet aligned with the pressure inlet; and a piston assembly to selectively engage the seat ring for controlling a fluid flowing from the pressure inlet to the pressure outlet, the piston assembly being internally disposed between the body, wherein the piston assembly comprises:

a piston having a piston head and a piston base including a bore therethrough to couple the pressure inlet to the pressure outlet;

a loading element disposed within the outer bore of the body to provide a loading force on the piston to predetermine an outlet pressure;

an adjustment spring disposed in the piston bore and cooperating with a threaded adjuster to alter the outlet pressure of the pressure regulator; and a piston seat, wherein the piston seat circumferentially engages the piston base.

14. The pressure regulator of claim 13, wherein the piston seat is externally coupled on the piston base such that the inlet pressure provides a supplemental force to retain the piston seat to the piston base.

15. The pressure regulator of claim 13, wherein the coefficient of thermal expansion of the piston seat is greater than the coefficient of thermal expansion of the piston base such that at a pressure inlet fluid temperature substantially below an ambient fluid temperature, the piston seat firmly contracts about the piston base.

16. A pressure regulator comprising:

a valve body having a pressure inlet, a pressure outlet, an outer wall, an inner wall, and enclosing an ambient pressure chamber;

a seat ring having an aperture and disposed in the valve body adjacent the pressure inlet;

a piston slidably disposed within the valve body and having an upper portion sealed against the outer wall, an intermediate portion sealed against the inner wall, and a narrowed base, the piston including a throughbore providing a flow path between the narrowed base and the pressure outlet;

an adjustable spring assembly, disposed in the throughbore and including:

a spring; and an adjustment nut having first threads on an external surface of the adjustment nut, the first threads adapted to cooperate with second threads on an internal surface of the throughbore to apply a bias force to the spring;

a loading element biasing the piston toward a first position;

a piston seat coupled to the piston base and positioned to selectively open and close the aperture in the seat ring in response to movement of the piston;

the piston shiftable between the first position in which the piston seat is spaced away from the seat ring providing flow communication between the inlet and the outlet through the throughbore, and a second position in which the piston seat is seated against the seat ring; and the upper portion of the piston having a first effective sensing area when the piston is in the first position and a second effective sensing area when the piston is moved away from the first position.

17. The pressure regulator of claim 1, wherein the loading element comprises an alloy resistant to hydrogen embrittlement.

18. A pressure regulator comprising:

a body having a pressure inlet;

a bonnet having a pressure outlet and being operatively coupled to the body; and a piston assembly internally disposed between the body and the bonnet for selectively engaging a seat ring within the body for controlling a fluid flowing from the pressure inlet to the pressure outlet, wherein the piston assembly comprises:

a piston having a piston head and a piston base including a bore therethrough to couple the pressure inlet to the pressure outlet, the piston having a first effective sensing area for a first operational mode and a second effective sensing area for a second operational mode;

a loading element operatively coupled to the piston to provide a loading force on the piston to predetermine an outlet pressure; and a piston seat to engage the seat ring for fluid control, wherein the piston seat circumferentially engages the piston base, wherein the piston bore includes adjustment means to adjust the outlet pressure, and wherein the adjusting means includes an adjustable spring assembly to counteract the loading force generated by the loading element.

* * * * *